E. G. STORM.
FARM TRACTOR.
APPLICATION FILED MAR. 2, 1918.
1,279,479.
Patented Sept. 17, 1918.
4 SHEETS—SHEET 3.
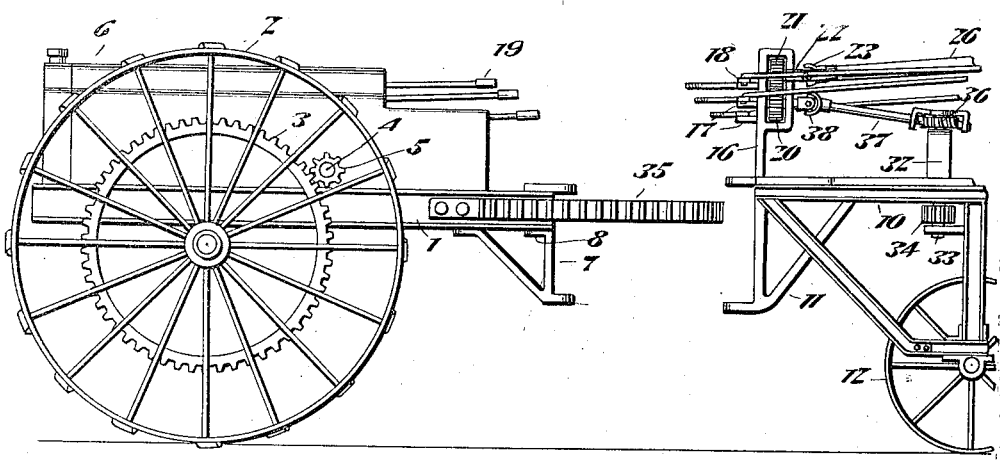
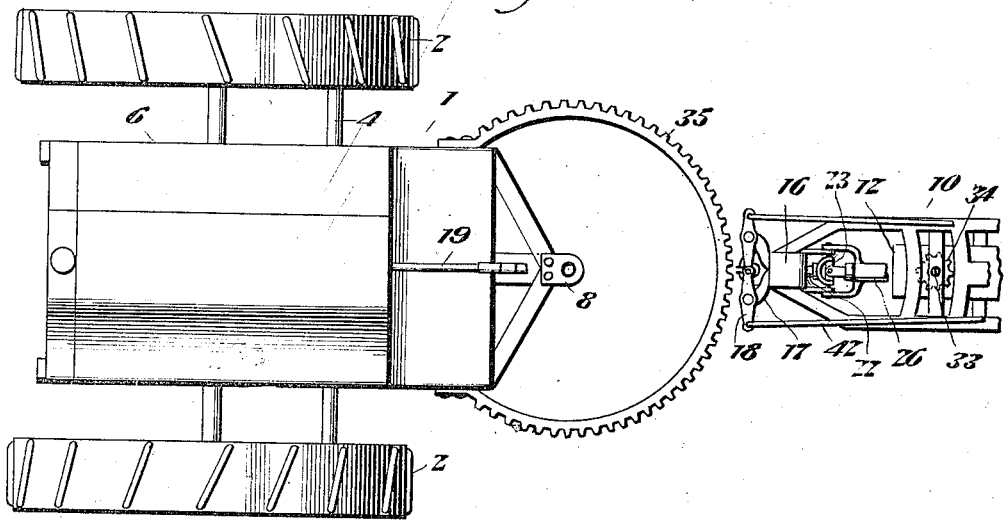

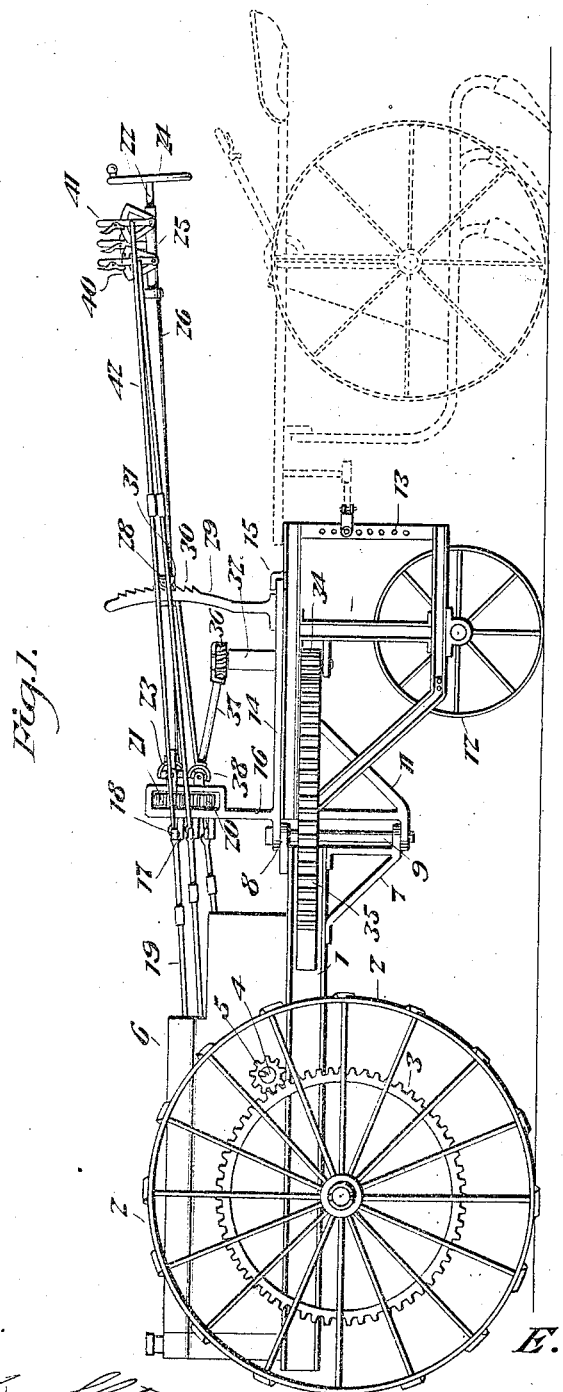
E. G. STORM.
FARM TRACTOR.
APPLICATION FILED MAR. 2, 1918.
1,279,479. Patented Sept. 17, 1918.
4 SHEETS—SHEET 1.

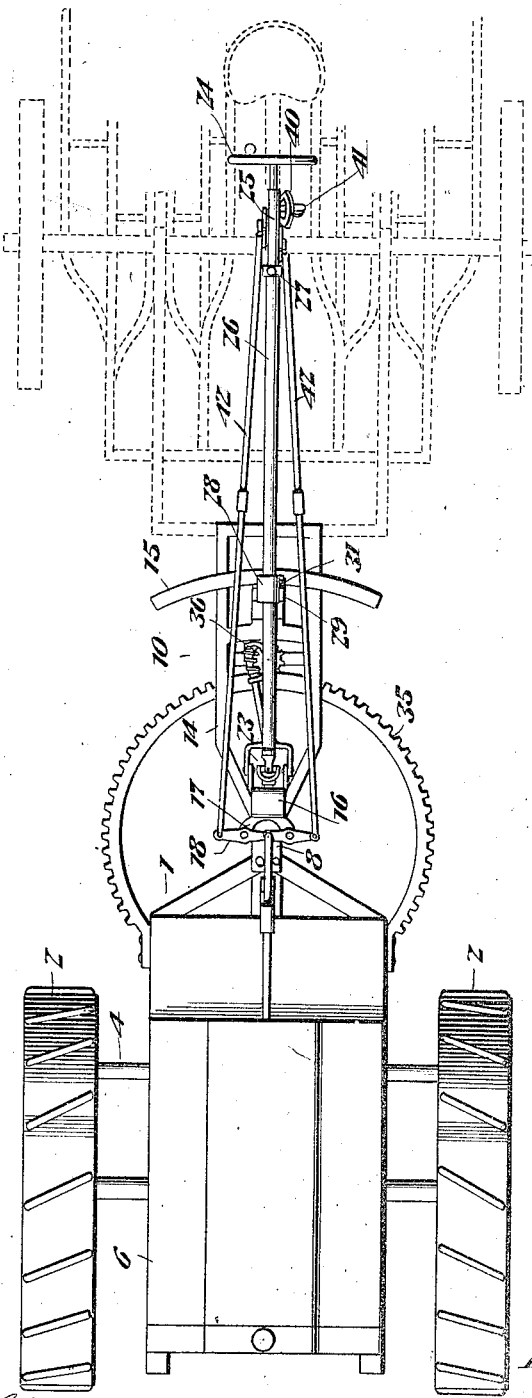

E. G. STORM.
FARM TRACTOR.
APPLICATION FILED MAR. 2, 1918.
1,279,479.
Patented Sept. 17, 1918.
4 SHEETS—SHEET 4.
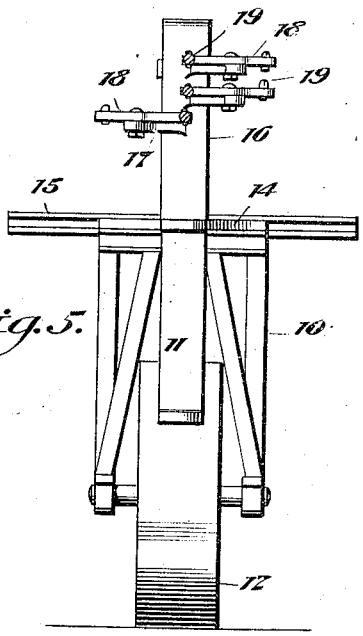
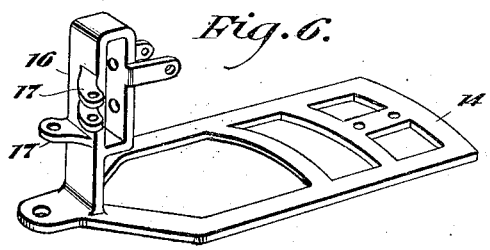
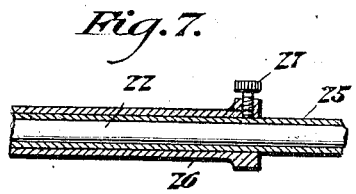
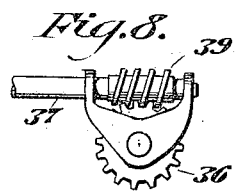
Inventor
E. G. Storm
By Victor J. Evans
Attorney
Witnesses

UNITED STATES PATENT OFFICE.

EDWARD G. STORM, OF LEBANON, INDIANA, ASSIGNOR OF ONE-HALF TO SAMUEL M. STORM, OF LEBANON, INDIANA.

FARM-TRACTOR.

1,279,479.  Specification of Letters Patent.  Patented Sept. 17, 1918.

Application filed March 2, 1918. Serial No. 220,030.

*To all whom it may concern:*

Be it known that I, EDWARD G. STORM, a citizen of the United States, residing at Lebanon, in the county of Boone and State of Indiana, have invented new and useful Improvements in Farm-Tractors, of which the following is a specification.

This invention relates to farm tractors and it consists in the novel features hereinafter described and claimed.

An object of the invention is to provide a tractor of simple and durable structure adapted to be used for drawing agricultural machines over the soil as for instance cultivators, plows, spreaders, harvesters and the like.

With this object in view the tractor comprises a frame which is supported upon traction wheels adapted to be driven by an engine carried by the frame in a usual manner. A truck frame is pivotally connected with the rear portion of the engine frame and the agricultural machine may be connected with the truck frame in a usual manner. Means are provided for turning or swinging the engine frame with relation to the truck frame. A plate is pivotally connected with the engine frame at a point in vertical alinement with the pivotal connection between the engine frame and the truck frame. Controlling devices or mechanisms are mounted upon the plate and may be operatively connected with the transmission, intake valve and spark timing mechanism of the engine.

In the accompanying drawings:

Figure 1 is a side elevation of the farm tractor.

Fig. 2 is a top plan view of the same.

Fig. 3 is a side view of the same showing parts disconnected.

Fig. 4 is a fragmentary top plan view of the same.

Fig. 5 is a fragmentary front view of the truck.

Fig. 6 is a perspective view of a plate used in the structure.

Fig. 7 is a detail longitudinal sectional view of part of the steering means of the tractor.

Fig. 8 is a detail plan view of a worm and worm wheel structure used on the tractor.

The farm tractor comprises a frame 1 of conventional pattern which is supported upon traction wheels 2 there being mounted gear wheels 3 at the sides of the said wheels 2. A shaft 4 is journaled transversely across the frame 1 and carries at its ends pinions 5 which mesh with the wheels 3. The shaft 4 is driven from the engine 6 and is mounted upon the frame 1 in a usual manner. A bracket 7 is fixed to the rear end of the frame 1 and a lug 8 is attached to the upper side of the frame 1 at the rear end thereof. A king bolt 9 is carried by the bracket 7 and lug 8.

A truck frame 10 is provided at its forward end with a bracket 11 which is pivotally connected with the lower portion of the king bolt 9. The rear part of the truck frame 10 is supported upon a ground wheel 12. The rear vertical bars of the truck frame 10 are provided with perforations 13 adapted to receive bolts whereby a trailing machine as for instance a cultivator or plow may be adjustably connected with the truck frame 10 in a usual manner.

A plate 14 is pivotally connected at its forward end with the upper end of the king bolt 9 and the rear portion of the plate 14 is slidably mounted under a guide 15 which in turn is mounted at the upper side of the truck frame 10. A standard 16 is mounted upon the forward portion of the plate 14 and the said standard 16 is provided at its intermediate portion and at its forward side with a series of forwardly disposed spaced lugs 17 upon each of which is fulcrumed a lever 18. Longitudinally extensible rods 19 are connected at their rear ends with the inner ends of the levers 18 and the forward ends of the rods 19 are connected with the transmission mechanism, intake valve and spark timing mechanism of the engine 6 in a usual manner and are adapted to control the mechanism.

Intermeshing gear wheels 20 and 21 are journaled for rotation at the upper rear portion of the standard 16 and a rod 22 is connected at its forward end with the shaft of the gear wheel 21 by means of a universal joint 23. The rod 22 carries at its rear end a hand wheel 24. The rod 22 is journaled in a tube 25 which is adjustably mounted in a pipe 26 and held at an adjusted position therein by means of a set screw 27 which passes through the side of the pipe 26 and impinges against the side of the tube 25. The pipe 26 carries at a point between its ends a bearing block 28 which is slidably received in a guide 29 fixed upon the rear portion of the plate 14. The guide 29 is provided at its rear portion with a number of teeth 30 and the block 28 carries a spring pressed pawl 31 adapted to engage the teeth 30 whereby the block 28 is held at an adjusted position upon the guide 29. It is apparent that the pipe 26 and its contents may be swung vertically within the guide 29 and when at a desired position may be held by permitting the pawl 31 to engage the teeth 30 upon the said guide. By turning the rods 23 rotary movement is transmitted to the gear wheel 21 which in turn will rotate the gear wheel 20.

A standard 32 is mounted upon the intermediate portion of the truck frame and passes through the plate 14 and a shaft 33 is journaled at its upper portion in the standard 32 and the said shaft 33 is vertically disposed. A gear wheel 34 is carried at the lower end of the shaft 33 and meshing with the teeth of a gear segment 35 which is fixed at its ends to the sides of the frame 1. The center of the segment 35 is at the same point at which the axis of the king bolt 9 is located. A worm wheel 36 is mounted at the upper end of the shaft 33 and a shaft 37 is operatively connected at one end by means of a universal joint 38 with the shaft of the gear wheel 20 hereinbefore described. A shaft 37 carries at its rear end a worm 39 which meshes with the worm wheel 36.

When the wheel 36 is rotated as hereinbefore described rotary movement is transmitted by the shaft 37 and worm and worm wheels to the shaft 33 which in turn rotates the gear wheel 34. Inasmuch as the gear wheel 34 meshes with the teeth of the segment 35 the segment is turned whereby the frame 1 is turned or directed with relation to the truck frame 10 to which the agricultural machine is attached. Consequently the tractor may be guided by one who is seated upon the agricultural machine and who uses the hand wheel 24.

Segments 40 are mounted upon the rear portion of the tube 25 and levers 41 are pivoted to the said segments 40 and longitudinally extensible rods 42 operatively connect the levers 41 with the outer ends of the levers 18. Hence it will be seen that by swinging the levers 41 the rods 42 are moved longitudinally whereby the levers 18 are swung and they in turn move their connected rods 19 which adjust or control the transmission, intake and timing mechanisms of the engine 6. After the parts have been properly adjusted the inner ends of the levers 18 lie substantially in vertical alinement with the axis of the king pin 9 and consequently minor turning of the frame 1 with relation to the frame 10 may be accomplished by shifting the inner ends of the levers 18 to such an extent as to affect the controlling mechanisms with which they are operatively connected. However should major turning of the frame 1 with relation to the frame 10 be required the operator may manipulate the levers 41 at the time that the rod 22 is turned in order to maintain the inner ends of the levers 18 in alinement with the axis of the spring bolt 9.

From the foregoing description taken in conjunction with the accompanying drawings it will be seen that a farm tractor of simple and durable structure is provided and that the same may be economically used for drawing agricultural machines over the surface of the soil and that the tractor may be controlled by one who is seated upon the agricultural machine.

Having described the invention what is claimed is:

A tractor comprising an engine driven frame, a truck frame pivotally connected thereto and supporting an end thereof, a plate pivotally connected with the engine driven frame at the pivot and extending over the truck and movable with relation to the same, manually operable means mounted upon the plate for turning the engine driven frame with relation to the truck frame and means mounted upon the plate for controlling the engine and including members articulated at a point substantially in alinement with the axis of the pivot.

In testimony whereof I affix my signature.

EDWARD G. STORM.